(12) United States Patent
Huo

(10) Patent No.: US 11,971,816 B2
(45) Date of Patent: *Apr. 30, 2024

(54) HOST SYSTEM NOTIFICATION BASED ON ENTRY MISS

(71) Applicant: Micron Technology, Inc., Boise, ID (US)

(72) Inventor: Binbin Huo, Sauerlach (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,832

(22) Filed: Jun. 13, 2022

(65) Prior Publication Data
US 2022/0308993 A1    Sep. 29, 2022

Related U.S. Application Data

(63) Continuation of application No. 17/176,911, filed on Feb. 16, 2021, now Pat. No. 11,360,888.

(51) Int. Cl.
| G06F 12/02 | (2006.01) |
| G06F 12/0817 | (2016.01) |
| G06F 12/0873 | (2016.01) |
| G06F 12/0882 | (2016.01) |

(52) U.S. Cl.
CPC ...... *G06F 12/0246* (2013.01); *G06F 12/0253* (2013.01); *G06F 12/0822* (2013.01); *G06F 12/0873* (2013.01); *G06F 12/0882* (2013.01); *G06F 2212/7201* (2013.01)

(58) Field of Classification Search
None
See application file for complete search history.

(56) References Cited

U.S. PATENT DOCUMENTS

| 11,200,597 | B2 | 12/2021 | Deangelo et al. |
| 11,237,953 | B2 | 2/2022 | Cariello |
| 11,360,888 | B1 | 6/2022 | Huo |
| 2017/0160933 | A1 | 6/2017 | De Jong et al. |
| 2019/0220396 | A1 | 7/2019 | Lin |
| 2020/0110698 | A1 | 4/2020 | Kanno et al. |

FOREIGN PATENT DOCUMENTS

CN    114942858    8/2022

*Primary Examiner* — Kevin Verbrugge
(74) *Attorney, Agent, or Firm* — Schwegman Lundberg & Woessner, P.A.

(57) ABSTRACT

Various embodiments enable sending a notification to a host system based on an address mapping entry miss (or mismatch) on a memory sub-system, which can facilitate an update of one or more address mapping entries stored on the host system.

20 Claims, 7 Drawing Sheets

HOST SYSTEM NOTIFICATION BASED ON ENTRY MISS

PRIORITY APPLICATION

This application is a continuation of U.S. application Ser. No. 17/176,911, filed Feb. 16, 2021, which is incorporated herein by reference in its entirety.

TECHNICAL FIELD

Embodiments of the disclosure relate generally to memory devices and, more specifically, to sending a notification to a host system based on an address mapping entry miss (or mismatch) on a memory sub-system, which can facilitate an update of one or more address mapping entries stored on the host system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
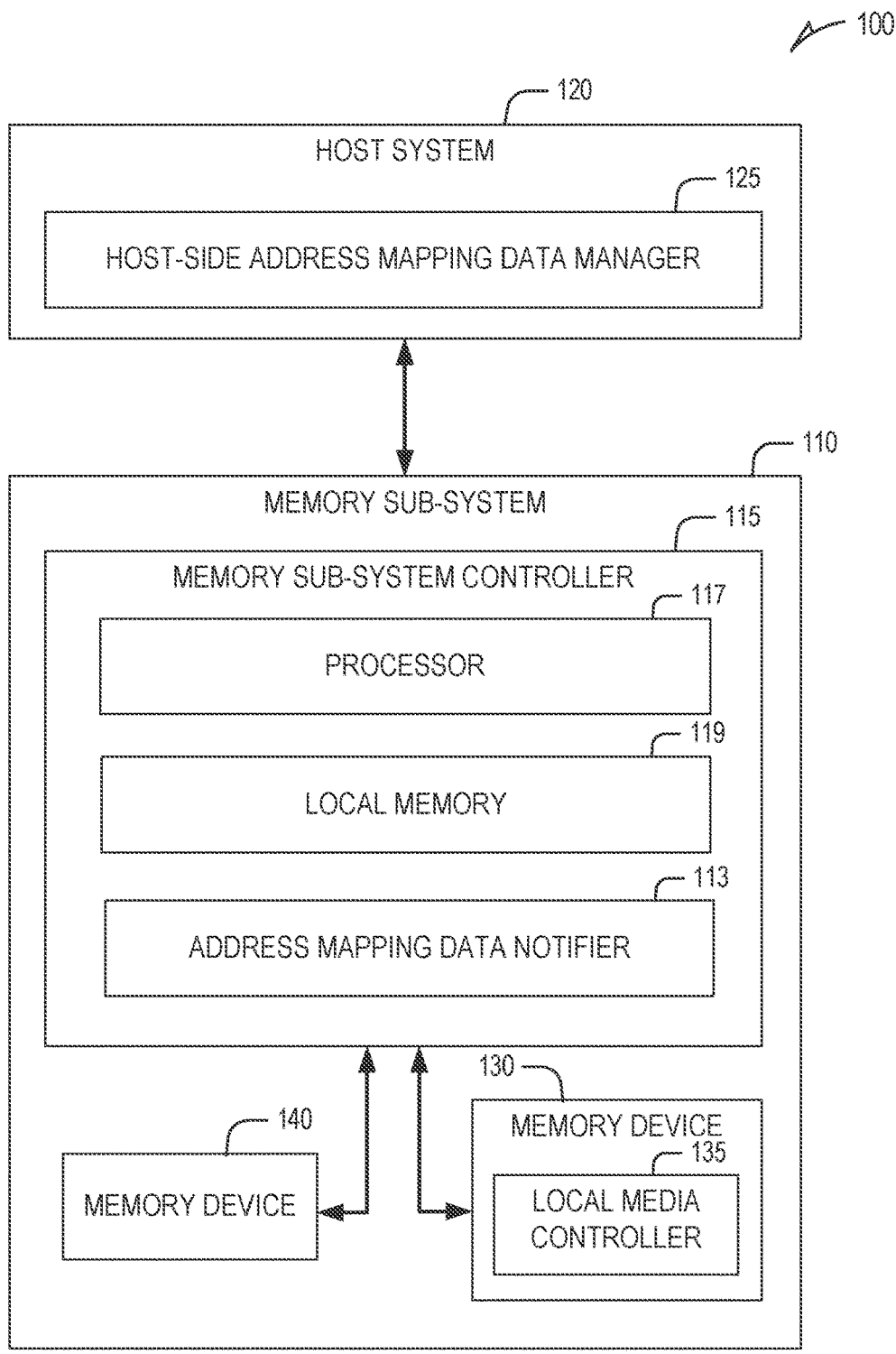
FIG. 1 is a block diagram illustrating an example computing system that includes a memory sub-system, in accordance with some embodiments of the present disclosure.

Aspects of the present disclosure are directed to sending a notification to a host system based on an address mapping entry miss (or mismatch) on a memory sub-system, which can facilitate (e.g., trigger) an update of one or more address mapping entries stored on the host system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

In certain traditional computing environments, a host system operably coupled to a memory sub-system can store (e.g., cache) one or more logical memory address-to-physical memory address (L2P) mapping entries on the host system (e.g., local memory of the host system). By doing so, the host system can translate a logical memory address (e.g., LBA) to a physical memory address (e.g., physical block address (PBA)), and include the logical memory address and the physical memory address in one or more requests (e.g., read requests) that the host system sends to the memory sub-system. Such host-side translation can improve performance of the memory sub-system by permitting the memory sub-system to avoid L2P translations on the memory side in certain situations. For some embodiments, L2P mapping entries stored on the host system are encrypted, thereby limiting authorized access to the L2P mapping entries by the host system.

However, as L2P mappings change on the memory sub-system (e.g., due to garbage collection on the memory sub-system), L2P mapping entries stored (e.g., cached) on the host system can become inconsistent with corresponding L2P mapping entries on the memory sub-system. Accordingly, the host system eventually needs to read (e.g., retrieve) the latest version of one or more L2P mapping entries from the memory sub-system and reload (e.g., refresh or replace) the stored (e.g., cached) L2P mapping entries on the host system with the retrieved L2P mapping entries. Efficient techniques for triggering such a reload by the host system could not only reduce or avoid unnecessary reloads by the host system (which can expend resources of the host system, memory sub-system, or both), but could also ensure that stored L2P mapping entries are as up-to-date as possible.

Aspects of the present disclosure address the above and other deficiencies by notifying a host system based on an address mapping entry miss on a memory sub-system, which can facilitate update of one or more address mapping entries stored on the host system (e.g., cause the host system to update or reload one or more address mapping entries stored or cached on the host system). For instance, where a garbage collection process is complete or partially complete with respect to one or more units (e.g., one or more block) of memory associated with a portion (e.g., region or subregion) of address mapping data (e.g., L2P mapping data) that is also stored on a host system, a memory sub-system can issue a notification to the host system in response to: the memory sub-system receiving from the host system a new data request (e.g., new data read request) comprising a select physical memory address and a select logical memory address associated with the portion of address mapping data; and the memory sub-system determining that there is a mismatch between address information provided in the new data request and mapping described by an address mapping entry, on the memory sub-system, corresponding to the select logical memory address. For instance, a mismatch can occur when the address mapping entry corresponding on the memory sub-system describes a mapping between the select logical memory address and another physical memory address that is different from the select physical memory address provided by the new data request. This mismatch can be referred to as an address mapping entry miss event. In response to receiving the notification, the host system can reload (or otherwise update) its copy of the portion of address mapping data using a new copy of the portion retrieved from the memory sub-system by the host system. In this way, the notification can trigger an update of one or more portions of address mapping data stored on the host system.

Various embodiments described herein comprise a memory sub-system determining whether a select portion of address mapping data is currently stored on a host system (e.g., select portion is active). In response to the select portion being stored on the host system, the memory sub-system can cause a notification to be sent to the host system in response to the memory sub-system receiving a data request (e.g., data read request or data write request) that comprises a select logical memory address and a select physical memory address and where the select logical memory address (of the data request) does not map to the select physical memory address (of the data request) based on a mapping described by an address mapping entry (e.g., for the select logical memory address) in the address mapping data stored on the memory sub-system. This lack of mapping (between the select logical memory address and the select physical memory address, in view of the corresponding address mapping entry) can indicate an address mapping entry miss (e.g., an address mapping entry miss event) or can indicate that the corresponding address mapping entry mismatches a host-side address mapping entry used by the host system (the host-side address mapping entry used by the host system to translate the select logical memory address to the select physical memory address).

For some embodiments, the data request received from the host system can comprise a copy of a host-side address mapping entry used by the host system to translate the select logical memory address to the select physical memory address, where the host-side address mapping entry comprises (e.g., describes) the select logical memory address and the select physical memory address. For instance, the copy of the host-side address mapping entry can be included in a descriptor of the data request.

For some embodiments, the notification indicates that the select logical memory address and the select physical memory address do not match, which can cause the host system to reload the select portion of address mapping data from the memory sub-system (e.g., by retrieving a copy of the latest version of the select portion from the memory sub-system and storing the retrieved copy on the host system). Alternatively, the notification can specifically indicate that the host system should reload the select portion of address mapping data from the memory sub-system. Additionally, the notification can specify the select portion that should be reloaded by the host system.

For some embodiments, operations described herein (for causing the notification to be sent to the host system) are performed by the memory sub-system while a garbage collection process is being performed on one or more units of memory (e.g., pages or blocks) associated with the select portion of the address mapping data. For instance, the operations can be performed as part of the garbage collection process. Alternatively, operations (for causing the notification to be sent to the host system) are performed by the memory sub-system after a garbage collection process has been performed on one or more units of memory (e.g., pages or blocks) associated with the select portion of the address mapping data (e.g., in response to completion of the garbage collection process). As described herein, performing a garbage collection process on one or more units of memory can cause mappings within the select portion of the address mapping data to change (e.g., as mappings between logical memory addresses and physical memory addresses change as result of data movement caused by the garbage collection process).

As used herein, a logical memory address can comprise a logical block address (LBA), which can be provided by a host system to a memory device or a memory sub-system. For example, depending on a physical interface used between a host system and a memory device/memory sub-system, an LBA can comprise a 2-byte or 4-byte number. As used herein, a physical memory address can comprise a memory address on a memory device or a memory sub-system where data (e.g., user data) is stored. For example, the physical memory address can comprise a physical block address (PBA), which can be a position within an underlying non-volatile memory device that can be identified by a 4-byte number or a tuple of numbers (e.g., die ID, block ID, page ID). As used herein, address mapping data can comprise logical memory address-to-physical memory address (L2P) data (e.g., L2P mapping or translation table), which can associate (and therefore facilitate translation or reconstruction of) a logical memory address to a physical memory address of a memory device or a memory sub-system.

As used herein, a data request to a memory sub-system can comprise a data read request (e.g., read command) or a data write request (e.g., write command) to the memory sub-system.

As used herein, an address mapping entry miss or mismatch can comprise where a select logical memory address (e.g., LBA) and a select physical memory address (e.g., PBA) provided by a host system (e.g., in a data request from the host system) do not map to each other based on a mapping described by an address mapping entry of a memory system (e.g., a mapping implied by the LBA and PBA from the data request misses or mismatches the mapping described by the address mapping entry). For instance, an address mapping entry associated with (e.g., corresponding to) the select logical memory address can be missing on the memory sub-system (e.g., missing from the address mapping data) or the address mapping entry can indicate that the select logical memory address maps to a physical memory address different from the select physical memory address provided by the host system. As described herein, for some embodiments, the address mapping entry of the memory sub-system is from address mapping data stored on the memory sub-system (e.g., stored on local memory of the memory sub-system).

Disclosed herein are some examples of sending a notification to a host system based on an address mapping entry miss on a memory sub-system, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLCs), can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The host system 120 includes a host-side address mapping data manager 125 that enables or facilitates local storage (e.g., caching) of a copy of one or more portions of address mapping data, from the memory sub-system 110, on the host system 120. The host system 120 can, for example, cache the copy of one or more portions of address mapping data in local memory of the host system 120. For some embodiments, the copy of one or more portions of address mapping data on the host system 120 can enable the host system 120: to translate (on the host system 120) a logical memory address of the memory sub-system 110 to a physical memory address of the memory sub-system 110 prior to sending a data request to the memory sub-system 110; and to generate a data request that includes both the logical memory address and the physical memory address from the translation. As described herein, including a logical memory address and a physical memory address in a data request can (in certain times) obviate the need for the memory sub-system 110 to translate the logical memory address upon receiving the data request, and enable the memory sub-system 110 to service the data request using the physical memory address provided within the data request. The host-side address mapping data manager 125 can enable the host system 120 to update the copy of the one or portions of address mapping data stored on the host system 120, which can be necessitated by address mapping data on the memory sub-system 110 changing over time (e.g., as a garbage collection process is performed on one or more units of memory on the memory sub-system 110).

Based on the host-side address mapping data manager 125, the host system 120 can translate a select logical memory address to a select physical memory address based on a copy of one or more portions of address mapping data stored (e.g., cached) on the host system 120. For instance, the host-side address mapping data manager 125 can enable the host system 120 to identify a (host-side) address mapping entry in the copy of one or more portions of address mapping data associated with (e.g., corresponding to) the select logical memory address, and retrieve the select physical memory address from the identified address mapping entry.

The host-side address mapping data manager 125 can cause the host system 120 to periodically determine (e.g., detect) whether the host system 120 has received a notification from the memory sub-system 110 regarding the mapping of a select logical memory address and a select physical memory address included by a data request from the host system 120 to the memory sub-system 110. The periodic determination can commence after the host system 120 sends the data request to the memory sub-system 110. Depending on the embodiment, the notification can indicate whether a first mapping, between the select logical memory address and the select physical memory address of the data request, matches a second mapping described by a related address mapping entry in address mapping data stored on the memory sub-system, where the related address mapping entry is associated with (e.g., corresponds to) the select logical memory address. Alternatively, the notification can indicate whether the host system 120 should reload or update the copy of one or more portions of address mapping data on the host system 120 using a new copy of the one or more portions of address mapping data retrieved from the memory sub-system 110.

In response to determining that a notification is received from the memory sub-system 110 (e.g., after a data request is sent from the host system 120 to the memory sub-system 110), the host-side address mapping data manager 125 can cause the host system 120 to update a copy of one or more portions of address mapping data on the host system 120 based on a copy of the one or more portions of address mapping data retrieved from the memory sub-system 110. For example, the host system 120 can send, to the memory sub-system 110, a request for a copy of the one or more portions of address mapping data, can receive the requested copy from the memory sub-system 110, and can store the requested copy on the host system 120 in place of the old copy of one or more portions of address mapping data on the host system 120.

Depending on the embodiment, the host-side address mapping data manager 125 can represent, or form part of, a software driver (e.g., L2P driver) or a L2P management software (e.g., L2P manager or L2P management service) operating on the host system.

The memory sub-system controller 115 includes an address mapping data notifier 113 that enables or facilitates the memory sub-system controller 115 to send a notification to the host system 120 based on an address mapping entry miss on the memory sub-system 110. Operations performed by the memory sub-system controller 115, based on the address mapping data notifier 113, can be performed during a garbage collection process being performed on the memory sub-system 110, or performed after completion of a garbage collection process on the memory sub-system 110. Additionally, depending on the embodiment, operations performed by the memory sub-system controller 115, based on the address mapping data notifier 113, can be performed as part of a garbage collection process performed on the memory sub-system 110.

According to some embodiments, the local memory 119 of the memory sub-system controller 115 is used to store address mapping data that maps one or more logical memory addresses (e.g., LBAs) of the memory sub-system 110 to one or more physical memory addresses (e.g., PBAs) of one of the memory devices 130, 140. For instance, the address mapping data can comprise a table, such as L2P mapping table. The address mapping data can comprise one or more address mapping entries that each maps a logical memory address of the memory sub-system 110 to a physical memory address of one of the memory devices 130, 140. Depending on the embodiment, an address mapping entry can be searched for or identified based on a specified logical memory address. Additionally, for some embodiments, the local memory 119 is used to store tracking data that indicates whether one or more (remote) copies of one or more portions of the address mapping data are currently stored (e.g., cached) on the host system 120. Generally, the portion of address mapping data stored on the host system 120 is less than all of the address mapping data. For instance, the tracking data can comprise a table, which can be populated and updated by the host system 120 (based on the address mapping data notifier 113) as the host system 120 requests for copies of portions of the address mapping data stored on (and used by) the memory sub-system 110. For some embodiments, the address mapping data notifier 113 enables generation, storage, or updating of the tracking data on the local memory 119.

For some embodiments, the address mapping data notifier 113 causes the memory sub-system controller 115 to determine, based on the tracking data stored on the local memory 119, whether a (remote) copy of a select portion of the address mapping data is currently stored on the host system 120, where the select portion (of the address mapping data) is associated with a set of logical memory addresses of the memory sub-system 110. The select portion can comprise a minimum recognizable unit of the address mapping data. In response to determining that the remote copy of the select portion is currently stored on the host system 120 (e.g., the select portion is active on the host system 120), the address mapping data notifier 113 can cause the memory sub-system controller 115 to determine whether a data request has been received from the host system 120, where the data request comprises a select logical memory address of the memory sub-system 110 and a select physical memory address of the memory sub-system 110, and where the select logical memory address is included by the set of logical memory addresses associated with the select portion of the address mapping data. In response to determining that such a data request has been received by the memory sub-system 110, the address mapping data notifier 113 can cause the memory sub-system controller 115 to determine whether a first mapping between the select physical memory address and the select logical memory address matches a second mapping described by a related address mapping entry in a (local) copy of the select portion stored on the local memory 119, where the related address mapping entry is associated with the select logical memory address included by the data request.

For various embodiments, by the data request including both the select physical memory address and the select logical memory address, the memory sub-system 110 assumes that the host system 120 translated the select logical memory address to the select physical memory address based on a (first) mapping described by one or more portions of the address mapping data currently stored on the host system 120. If the (first) mapping does not match a (second) mapping described by an entry from the address mapping data stored on the local memory 119, the memory sub-system 110 assumes that the one or more portions of the address mapping data currently stored on the host system 120 are outdated, and the memory sub-system 110 can notify the host system 120 regarding the mismatch (e.g., in order to trigger an address mapping data update or reload on the host system 120). Accordingly, in response to determining that the first mapping does not match the second mapping, the address mapping data notifier 113 enables the memory sub-system controller 115 to cause a notification to be sent to the host system 120, where the notification can indicate that the first mapping does not match the second mapping. Alternatively, the notification can specifically indicate to the host system 120 that the host system 120 should update or reload one or more portions of the address mapping data stored on the host system 120.

FIGS. 2 through 5 are flow diagrams of example methods relating to notifying a host system based on an address mapping entry miss on a memory sub-system, in accordance with some embodiments of the present disclosure. The methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 400, 500 is performed by the memory sub-system controller 115 of FIG. 1 based on the address mapping data notifier 113. Additionally, or alternatively, for some embodiments, at least one of the methods 200, 400, 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
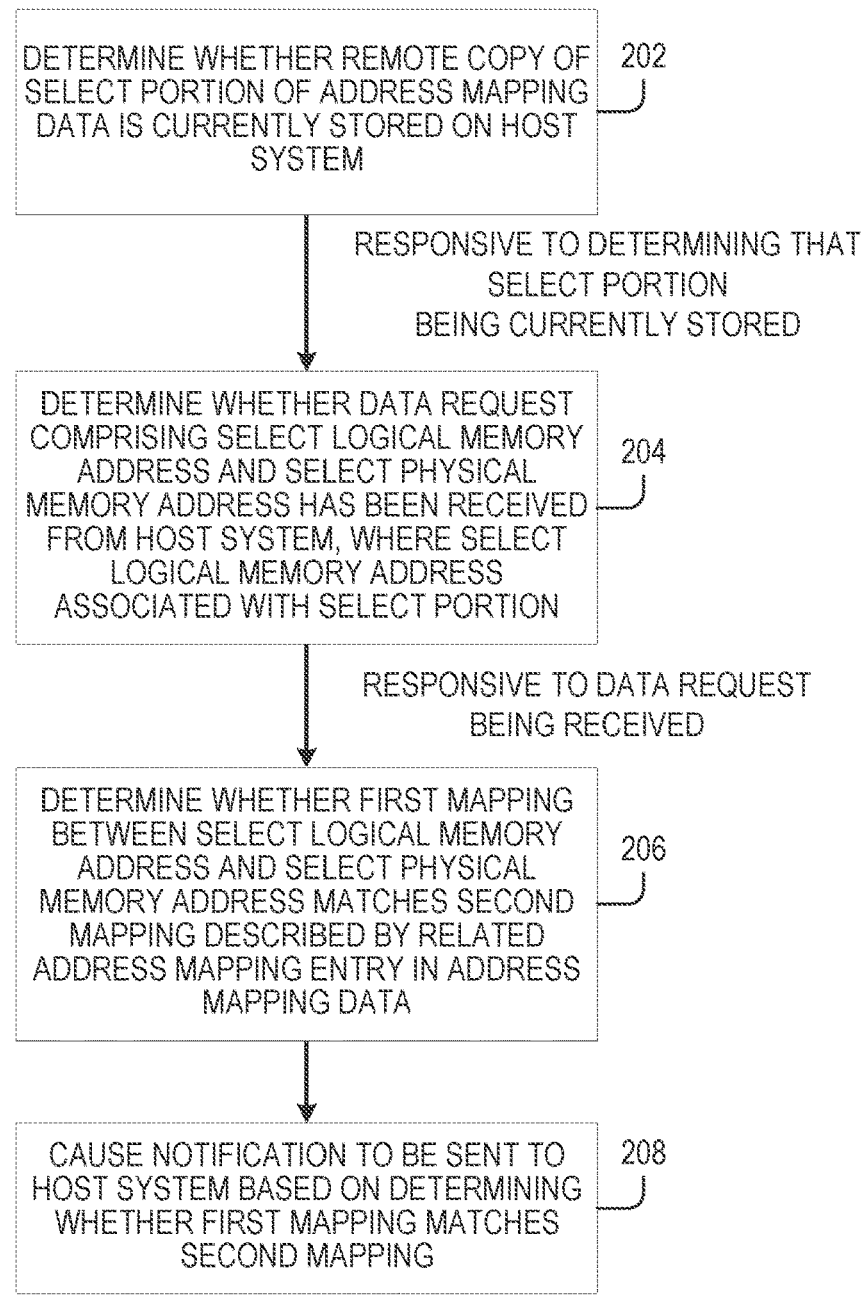
FIGS. 2 through 5 are flow diagrams of example methods relating to notifying a host system based on an address mapping entry miss on a memory sub-system, in accordance with some embodiments of the present disclosure.

Referring now to the method 200 of FIG. 2, the method 200 illustrates an example of sending a notification to a host system based on an address mapping entry miss on a memory sub-system. At operation 202, a processing device (e.g., the processor 117 of the memory sub-system controller 115) determines, based on tracking data stored on the memory sub-system (e.g., 110), whether a remote copy of a select portion of the address mapping data is currently stored on the host system (e.g., 120), where the select portion is associated with a set of logical memory addresses (e.g., used to translate the set of logical memory addresses to set of physical memory addresses). For some embodiments, the tracking data comprises a tracking table, where the tracking table is updated based on one or more requests received from the host system (e.g., request history) for copies of portions of the address mapping data stored on the local memory (e.g., the local memory 119 of the memory sub-system controller 115) of the memory sub-system.

In response to determining that the remote copy of the select portion is currently stored on the host system (e.g., 120), the processing device (e.g., 117) at operation 204 determines (e.g., detects) whether a data request has been received from the host system (e.g., 120), where the data request comprises a select logical memory address (e.g., LBA) and a select physical memory address (e.g., PBA), and where the select logical memory address is included by the set of logical memory addresses associated with the select portion currently stored on the host system. For some embodiments, the data request comprises a copy of a host-side address mapping entry that was used by the host system to determine the select physical memory address (e.g., translate the select logical memory address to the select physical memory address).

The select portion can comprise a plurality of address mapping entries for the set of logical memory addresses, where each address mapping entry describes a mapping from a given logical memory address to a given physical memory address. For some embodiments, the select portion of the address mapping data is associated with at least one of a sub-region or a region of a logical unit of memory as defined by a Universal Flash Storage (UFS) Joint Electron Device Engineering Council (JEDEC) specification, where the logic unit can have an independent memory address space. The remote copy of the select portion can represent a host-side copy of the select portion stored by the host system, while the memory sub-system continues to store and maintain (e.g., update) a local copy of the select portion on the memory sub-system. As described herein, the host-side copy of the select portion can enable the host system to translate an individual logical memory address in the set of logical memory addresses to a corresponding physical memory address, thereby permitting the host system to include the individual logical memory address and the corresponding physical memory address in a data request (e.g., data read request or data write request) generated on the host system and sent from the host system to the memory sub-system. As described herein, the inclusion of the select physical memory address in the data request can indicate to the memory sub-system that the host system has translated the select logical memory address to the select physical memory address.

In response to determining that the data request (comprising the select logical memory address and the select physical memory address) has been received, the processing device (e.g., 117) determines at operation 206 whether a first mapping between the select physical memory address and the select logical memory address matches a second mapping described by a related address mapping entry in a local copy of the select portion stored on the local memory (e.g., 119), where the related address mapping entry is associated with (e.g., corresponds to) the select logical memory address of the data request. For some embodiments, the processing device can determine that the first mapping does not match the second mapping where the related address mapping entry (associated with the select logical memory address) is missing from the address mapping data or where the related address mapping entry indicates that the select logical memory address maps to a physical memory address different from the select physical memory address. Either of these can represent that an address mapping entry miss has occurred on the memory sub-system. For some embodiments, the data request includes a copy of a host-side address mapping entry (used by the host system to translate the select logical memory address to the select physical memory address), and the determination of whether the first mapping and the second mapping matches is based on whether the host-side address mapping entry matches a corresponding address mapping entry in the select portion of the address mapping data of the memory sub-system. A determination that the first mapping matches the second mapping can be an indication that a host-side address mapping entry in the remote copy of the select portion (stored on the host system) matches a memory-side address mapping entry in the local copy of the select portion (stored on the memory sub-system). Eventually, the processing device can process the data request (e.g., data read request or data write request) using the select physical memory address provided in the data request.

At operation 208, the processing device (e.g., 117) causes a notification to be sent (e.g., from the memory sub-system 110) to the host system based on determination of operation 208, where the notification can indicate whether the first mapping matches the second mapping. For instance, in response to the processing device determining that the first mapping does not match the second mapping entry, the processing device causes the notification to be sent to the host system, where the notification indicates that the first mapping does not match the second mapping. Depending on the embodiment, the notification can specify the select portion of the address mapping data that the host system should reload from the memory sub-system in response to the first mapping not matching the second mapping. The sending of the notification can represent that an address mapping entry miss has occurred on the memory sub-system. Alternatively, in response to the processing device determining that the first mapping does match the second mapping entry, the processing device causes the notification to be sent to the host system, where the notification indicates that the first mapping does match the second mapping.

For some embodiments, one or more operations of the method 200 are performed while (e.g., parallel to or triggered by) a garbage collection process is performed on a unit of memory (e.g., cell, page, or block) of a memory device of the memory sub-system, where the unit of memory is associated with the set of logical memory addresses associated with the select portion of the address mapping data. For instance, operation 202 (the determination of whether the remote copy of the select portion is currently stored on the host system) is performed periodically while the garbage collection process is performed. Operation 204 (the determination of whether the data request has been received from the host system) is performed periodically while the garbage collection process is performed. For some embodiments, one or more operations of the method 200 are performed in response to completion of a garbage collection process performed on the unit of memory. Additionally, for some embodiments, one or more operations of the method 200 are performed as part of a garbage collection process performed on the unit of memory.

Figure 3:
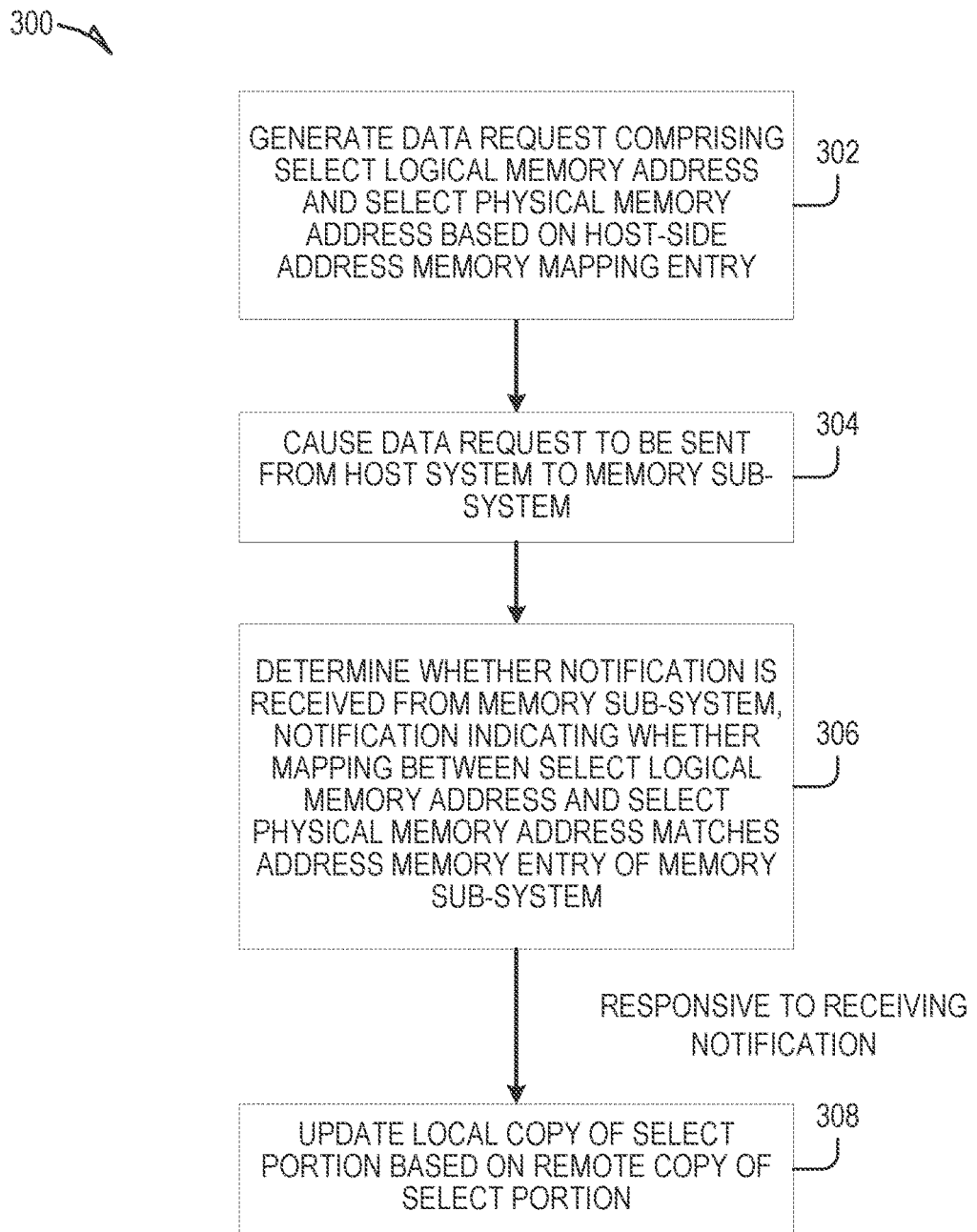

Referring now to the method 300 of FIG. 3, the method 300 illustrates an example of operations performed on a host system, in accordance with some embodiments. At operation 302, a processing device of a host system (e.g., 120) generates a data request that comprises a select logical memory address and a select physical memory address, where the data request is generated based on a host-side address mapping entry from a local copy of a select portion of address mapping data (e.g., of the memory sub-system 110) stored on the host system. For some embodiments, the host-side address mapping entry describes a first mapping between the select logical memory address and the select physical memory address. Additionally, for some embodiments, the local copy of the select portion represents a copy of the select portion of the address mapping data that the host system last received (e.g., retrieved) from the memory sub-system (e.g., 110).

Depending on the embodiment, the data request can comprise a copy of the host-side address mapping entry used (by the host system) to generate the data request at operation 302. Alternatively, the processing device of the host system (e.g., 120) sends, to the memory sub-system (e.g., 110), a copy of the host-side address mapping entry, where the copy of the host-side address mapping entry is sent to the memory sub-system separately from the sending the data request to the memory sub-system. For some embodiments, the copy of the host-side address mapping entry can be used to determine whether there is a match with a memory-side address mapping entry in the address mapping data of the memory sub-system.

The processing device of the host system (e.g., 120), at operation 304, causes the data request to be sent from the host system (e.g., 120) to the memory sub-system (e.g., 110).

At operation 306, the processing device of the host system (e.g., 120) determines (e.g., detects) whether a notification is received from the memory sub-system, where the notification indicates whether the first mapping matches a second mapping described by a related address mapping entry in a remote copy of the selection portion being stored on the memory sub-system (e.g., 110), and where the related address mapping entry is associated with (e.g., corresponding to) the select logical memory address. For some embodiments, operation 306 is performed periodically after the data request is sent from the host system (e.g., 120) to the memory sub-system (e.g., 110), and the periodic determination can continue until a response for the data request is received by the host system (e.g., 120) from the memory sub-system (e.g., 110).

With reference to operation 308, the processing device of the host system (e.g., 120) updates (e.g., reloads, replaces, or refreshes) the local copy of the select portion stored on the host system (e.g., 120) based on the remote copy of the select portion, which can be provided by (e.g., received or retrieved from) the memory sub-system (e.g., 110). For instance, operation 308 can comprise the processing device of the host system (e.g., 120) sending, from the host system (e.g., 120) to the memory sub-system (e.g., 110), a request for the remote copy of the select portion; and receiving, from the memory sub-system, the remote copy of the select portion (in response to the request for the remote copy). Additionally, the processing device of the host system (e.g., 120) stores the remote copy of the select portion, received from the memory sub-system, on the host system as a new version of the local copy of the select portion (thereby replacing the local copy with the new version).

Figure 4:
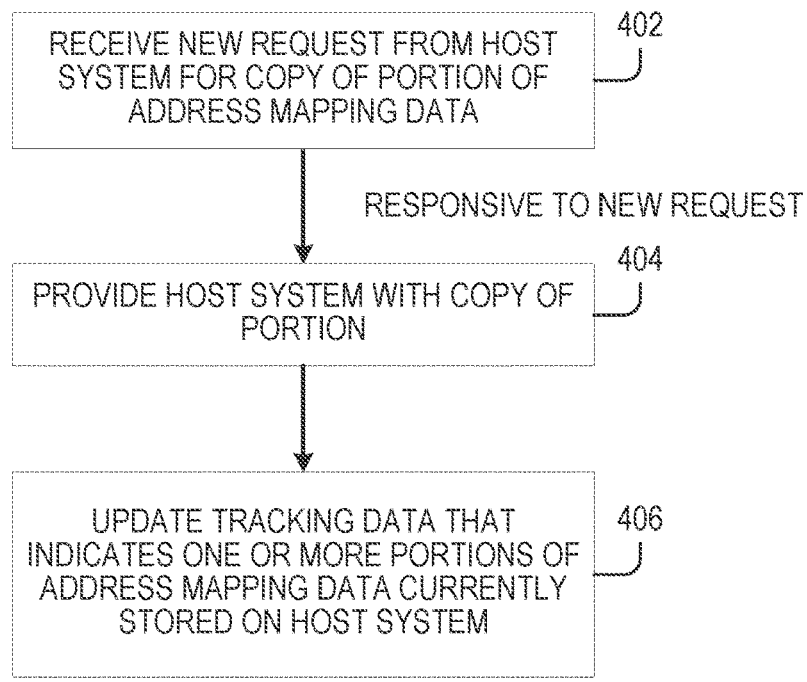

Referring now to the method 400 of FIG. 4, the method 400 illustrates an example of a memory sub-system providing a select portion of address mapping data to a host system, in accordance with some embodiments. At operation 402, a processing device (e.g., the processor 117 of the memory sub-system controller 115) receives, from a host system (e.g., 120), a new request for a copy (e.g., updated copy or latest copy) of a select portion of address mapping data on a memory sub-system (e.g., 110). The new request can specify the select portion being requested by the host system. As described herein, the new request can be sent from the host system to the memory sub-system in response to the memory sub-system sending a notification.

In response to the new request received by operation 402, the processing device (e.g., 117) provides the host system (e.g., 120) with the copy of the select portion requested at operation 404. Based on the copy of the select portion being provided to the host system (e.g., 120) at operation 404, the processing device (e.g., 117) updates tracking data on the memory sub-system (e.g., 110) at operation 406. For some embodiments, the tracking data on the memory sub-system indicates one or more portions of the address mapping data that are currently stored on the host system. Accordingly, the processing device providing the select portion at operation 404 can result in the tracking data being updated to include an entry indicating that the select portion was provided to the host system. As described herein, the tracking data can eventually be used by the processing device to determine whether a specific portion of address mapping data is currently stored on the host system (e.g., currently active).

Figure 5:
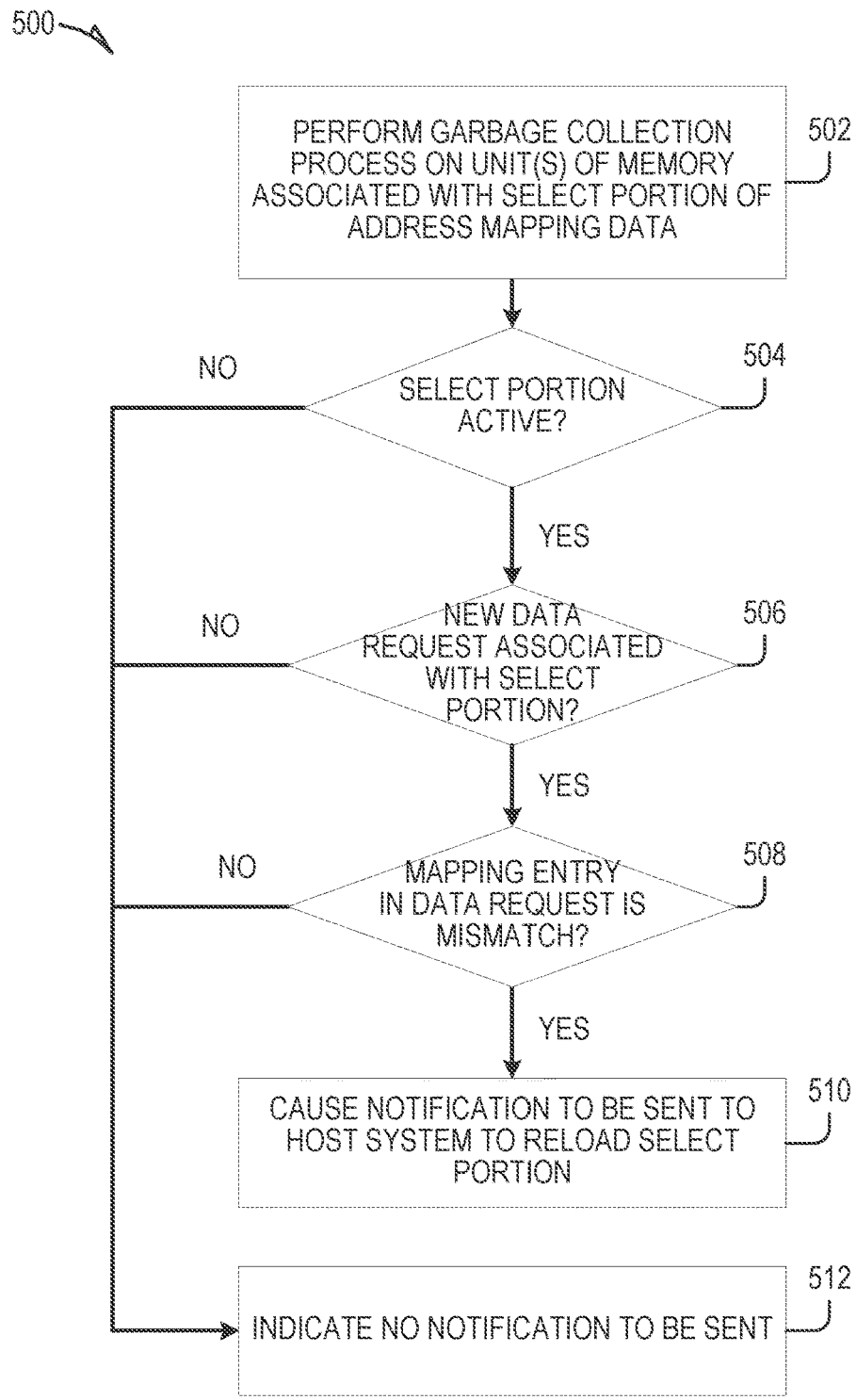

Referring now to the method 500 of FIG. 5, the method 500 illustrates an example of sending a notification to a host system based on an address mapping entry miss on a memory sub-system. At operation 502, a processing device (e.g., the processor 117 of the memory sub-system controller 115) performs a garbage collection process on one or more units of memory of a memory device (e.g., 140) associated with a select portion of address mapping data of a memory sub-system (e.g., 110).

At operation 504, the processing device (e.g., 117) determines whether the select portion of the address mapping data is currently active. For some embodiments, the select portion is active when the select portion is stored on a host system (e.g., 120) operable coupled to the memory sub-system (e.g., 110). In response to the select portion being active, the method 500 proceeds from operation 504 to operation 506; otherwise the method 500 proceeds from operation 504 to operation 512.

The processing device (e.g., 117) determines, at operation 506, whether a new data request is received at the memory sub-system (e.g., 110) from the host system (e.g., 120), where the new data request is associated with select portion of the address mapping data. In response to the new data request being received at the memory sub-system, the method 500 proceeds from operation 506 to operation 508; otherwise the method 500 proceeds from operation 506 to operation 512.

At operation 508, the processing device (e.g., 117) determines whether an address mapping entry included in a data request mismatches a corresponding address mapping entry from the address mapping data on the memory sub-system (e.g., 110). In response to the address mapping entry mismatching the corresponding address mapping entry (which indicates an address mapping entry miss), the method 500 proceeds from operation 508 to operation 510; otherwise the method 500 proceeds from operation 508 to operation 512. The processing device (e.g., 117) causes a notification to be sent from the memory sub-system (e.g., 110) to the host system (e.g., 120), where the notification can indicate that the host system (e.g., 120) should reload the select portion from the memory sub-system (e.g., 110).

At operation 512, the processing device (e.g., 117) indicates that no notification is to be sent to from the memory sub-system (e.g., 110) to the host system (e.g., 120).

Figure 6:
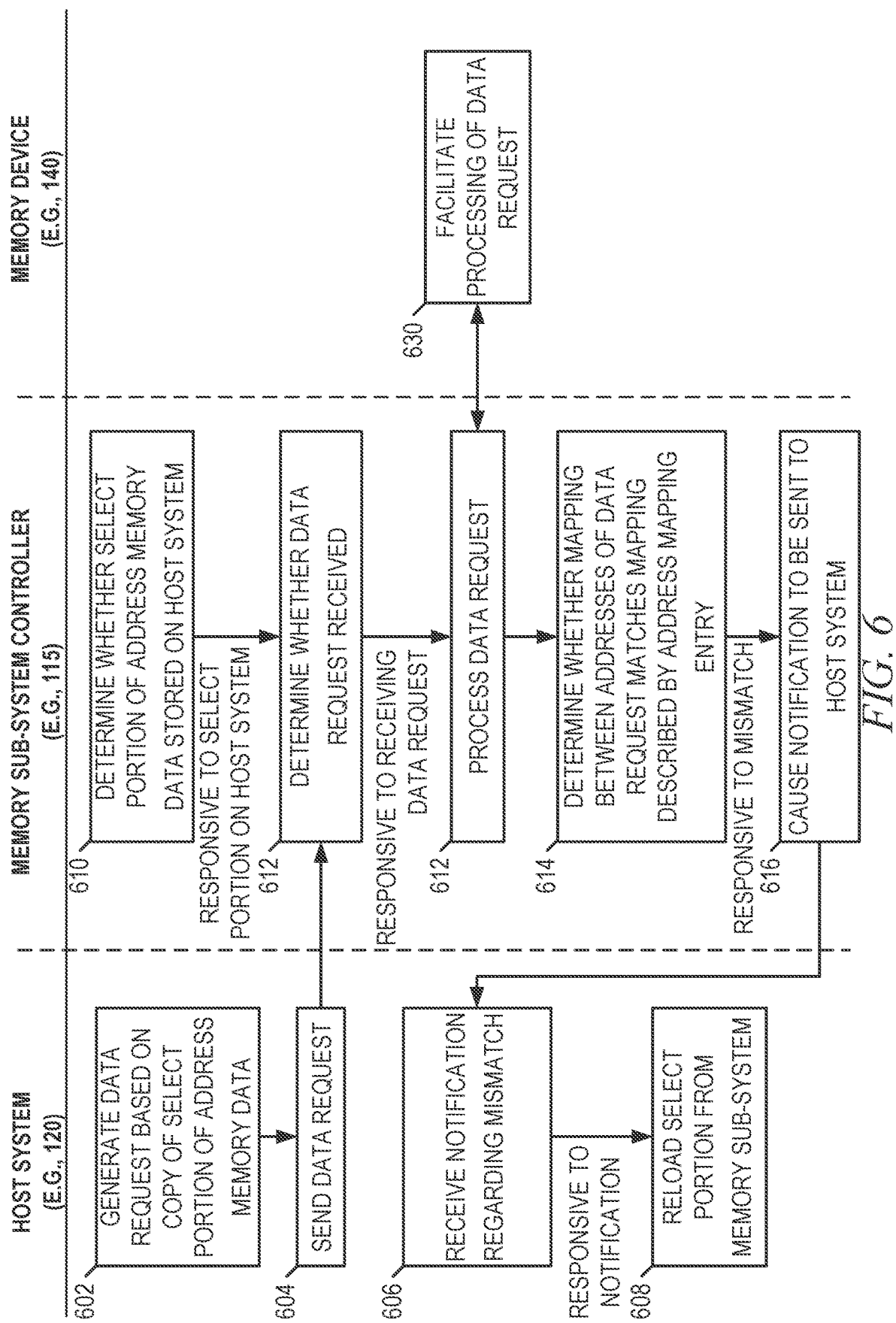
FIG. 6 provides an interaction diagram illustrating interactions between components of a computing environment in the context of some embodiments in which a method for sending a notification to a host system based on an address mapping entry miss on a memory sub-system as described herein is performed.

FIG. 6 provides an interaction diagram illustrating interactions between components of a computing environment in the context of some embodiments in which a method for sending a notification to a host system based on an address mapping entry miss detected on a memory sub-system as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 6, the host system can include the host system 120, the memory sub-system controller can include the memory sub-system controller 115, and the memory device can include the memory device 140.

As shown in FIG. 6, at operation 602, the host system 120 generates a data request based on a copy of a select portion of address mapping data. The host system 120 sends the generated data request to the memory sub-system 110 at operation 604.

At operation 610, the memory sub-system controller 115 determines whether the select portion of the address mapping data is currently stored on the host system 120. In response to determining that the select portion is currently stored on the host system 120, the memory sub-system controller 115 determines whether a data request is received from the host system 120 at operation 612.

In response to receiving the data request from the host system 120, the memory sub-system controller 115 processes the data request at operation 612. For instance, the memory sub-system controller 115 can process the data request using a physical memory address of the memory device 140 including within the data request. At operation 630, the memory device 140 can facilitate processing of the data request (e.g., by providing access to the memory device 140).

At operation 614, the memory sub-system controller 115 determines whether a first mapping, between the select logical memory address and the select physical memory address of the data request, matches a second mapping described by a related address mapping entry in address mapping data stored on the memory sub-system 110. In response to determining that the first mapping does not match the second mapping, the memory sub-system controller 115 causes a notification (regarding the mismatch) to be sent from the memory sub-system 110 to the host system 120 at operation 616.

The host system 120 receives the notification regarding the mismatch at operation 606, and the host system 120 responds to receiving the notification at operation 608 by reloading the select portion of the address mapping data from the memory sub-system 110.

Figure 7:
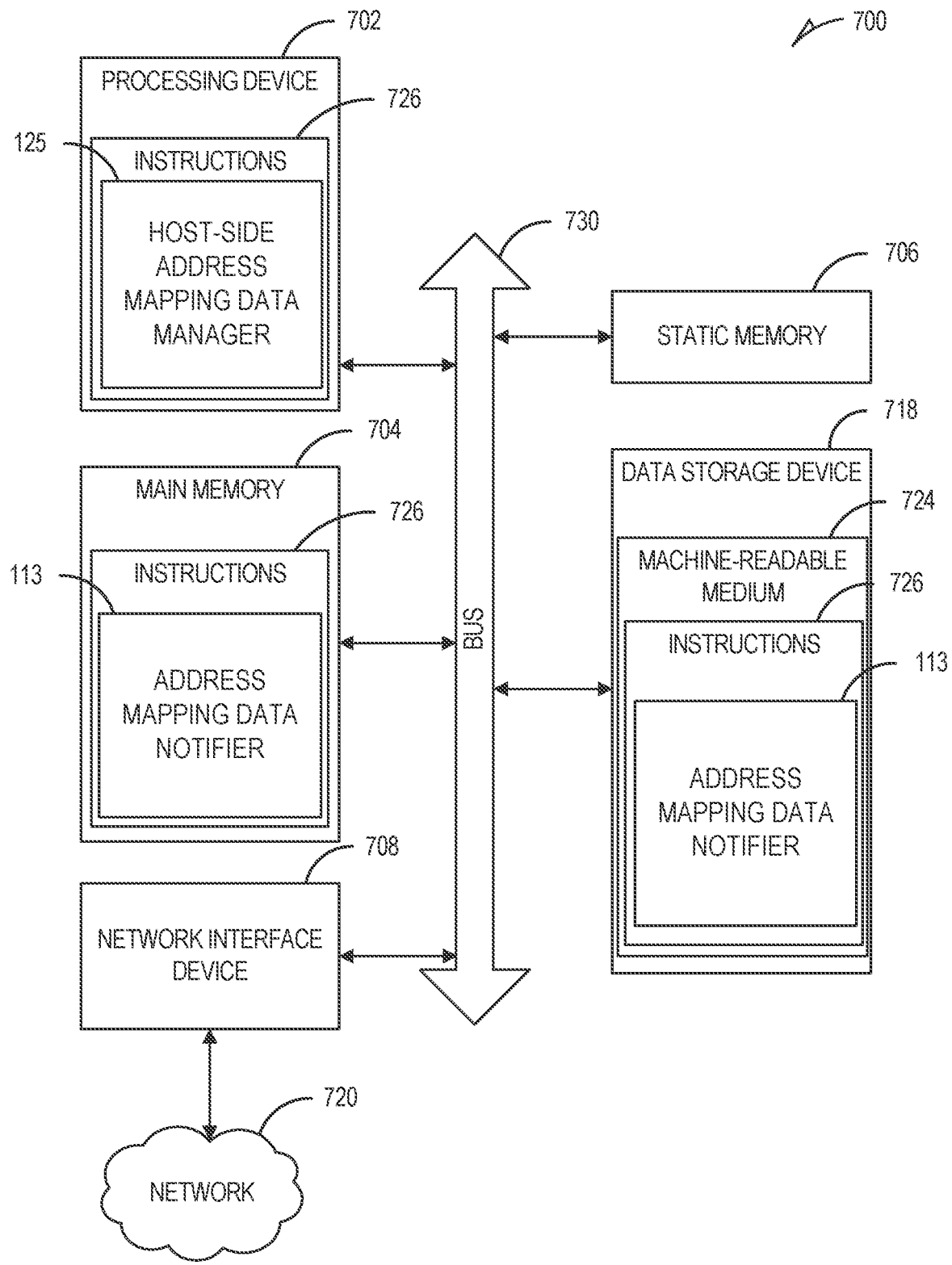
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to sending a notification to a host system based on an address mapping entry miss on a memory sub-system as described herein (e.g., the address mapping data notifier 113, the host-side address mapping data manager 125, or both of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A host system comprising:
a memory device storing a local copy of a select portion of address mapping data; and
a processing device, operatively coupled to the memory device, the processing device configured to perform operations comprising:
generating a data request comprising a select logical memory address and a select physical memory address, the data request being generated based on a host-side address mapping entry from the local copy of the select portion, and the host-side address mapping entry describing a first mapping between the select logical memory address and the select physical memory address;
causing the data request to be sent from the host system to a memory sub-system;
determining whether a notification is received from the memory sub-system, the notification indicating whether the first mapping matches a second mapping described by a related address mapping entry in a remote copy of the select portion being stored on the memory sub-system, and the related address mapping entry being associated with the select logical memory address; and
in response to determining that the notification is received from the memory sub-system, updating the local copy of the select portion based on the remote copy of the select portion.

2. The host system of claim 1, wherein the data request comprises a copy of the host-side address mapping entry used to generate the data request.

3. The host system of claim 1, wherein the operations comprise:
sending, to the memory sub-system, a copy of the host-side address mapping entry used to generate the data request, the sending of the copy of the host-side address mapping entry to the memory sub-system being separate from the sending of the data request to the memory sub-system.

4. The host system of claim 1, wherein the determining whether the notification is received from the memory sub-system is performed periodically after the data request has been sent from the host system to the memory sub-system.

5. The host system of claim 1, wherein the updating of the local copy of the select portion based on the remote copy of the select portion comprises:
sending, to the memory sub-system, a request for the remote copy of the select portion; and
receiving, from the memory sub-system, the remote copy of the select portion.

6. The host system of claim 5, wherein the updating of the local copy of the select portion based on the remote copy of the select portion comprises:
storing the remote copy of the select portion, received from the memory sub-system, on the host system as a new version of the local copy of the select portion.

7. At least one non-transitory machine-readable storage medium comprising instructions that, when executed by a processing device of a host system, cause the processing device to perform operations comprising:
generating a data request comprising a select logical memory address and a select physical memory address, the data request being generated based on a host-side address mapping entry from a local copy of a select portion of address mapping data, the local copy of the select portion being stored on the host system, and the host-side address mapping entry describing a first mapping between the select logical memory address and the select physical memory address;
causing the data request to be sent from the host system to a memory sub-system;
determining whether a notification is received from the memory sub-system, the notification indicating whether the first mapping matches a second mapping described by a related address mapping entry in a remote copy of the select portion being stored on the memory sub-system, and the related address mapping entry being associated with the select logical memory address; and
in response to determining that the notification is received from the memory sub-system, updating the local copy of the select portion based on the remote copy of the select portion.

8. The at least one non-transitory machine-readable storage medium of claim 7, wherein the data request comprises a copy of the host-side address mapping entry used to generate the data request.

9. The at least one non-transitory machine-readable storage medium of claim 7, wherein the operations comprise:
sending, to the memory sub-system, a copy of the host-side address mapping entry used to generate the data request, the sending of the copy of the host-side address mapping entry to the memory sub-system being separate from the sending of the data request to the memory sub-system.

10. The at least one non-transitory machine-readable storage medium of claim 7, wherein the determining whether the notification is received from the memory sub-system is performed periodically after the data request has been sent from the host system to the memory sub-system.

11. The at least one non-transitory machine-readable storage medium of claim 7, wherein the updating of the local copy of the select portion based on the remote copy of the select portion comprises:
sending, to the memory sub-system, a request for the remote copy of the select portion; and
receiving, from the memory sub-system, the remote copy of the select portion.

12. The at least one non-transitory machine-readable storage medium of claim 11, wherein the updating of the local copy of the select portion based on the remote copy of the select portion comprises:
storing the remote copy of the select portion, received from the memory sub-system, on the host system as a new version of the local copy of the select portion.

13. A method comprising:
determining, by a processing device of a memory sub-system, whether a remote copy of a select portion of address mapping data is currently stored on a host system based on tracking data, the tracking data indicating whether the remote copy of the selection portion of the address mapping data is currently stored on the host system, the address mapping data mapping one or more logical memory addresses to one or more physical memory addresses of a memory device, the select portion being associated with a set of logical memory addresses; and
in response to determining that the remote copy of the select portion is currently stored on the host system:
determining, by the processing device, whether a data request has been received from the host system, the data request comprising a select logical memory address and a select physical memory address, and the select logical memory address being included by the set of logical memory addresses; and in response to determining that the data request has been received:

determining, by the processing device, whether a first mapping between the select physical memory address and the select logical memory address matches a second mapping described by a related address mapping entry in a local copy of the select portion stored on the local memory, the related address mapping entry being associated with the select logical memory address; and based on the determining of whether the first mapping matches the second mapping, causing a notification to be sent from the memory sub-system to the host system, the notification indicating whether the first mapping matches the second mapping.

14. The method of claim 13, wherein the causing of the notification to be sent to the host system based on the determining whether the first mapping matches the second mapping comprises:

in response to determining that the first mapping does not match the second mapping entry, causing the notification to be sent to the host system, the notification indicating that the first mapping does not match the second mapping.

15. The method of claim 13, wherein the causing of the notification to be sent to the host system based on the determining whether the first mapping matches the second mapping comprises:

in response to determining that the first mapping does match the second mapping, causing the notification to be sent to the host system, the notification indicating that the first mapping does match the second mapping.

16. The method of claim 13, wherein the method is performed while a garbage collection process is performed on a unit of memory of the memory device, the unit of memory being associated with the set of logical memory addresses.

17. The method of claim 13, wherein the method is performed in response to completion of a garbage collection process performed on a unit of memory of the memory device, the unit of memory being associated with the set of logical memory addresses.

18. The method of claim 13, wherein the method is performed as part of a garbage collection process performed on a unit of memory of the memory device, the unit of memory being associated with the set of logical memory addresses.

19. The method of claim 13, comprising:

receiving, from the host system, a new request for an updated copy of the select portion; and in response to the new request, providing the host system with the local copy of the select portion of the address mapping data.

20. The method of claim 13, wherein the data request comprises a copy of a host-side address mapping entry that was used by the host system to determine the select physical memory address.

* * * * *